Nov. 27, 1934.　　　J. D. FREESE　　　1,982,609
FISHING LURE
Filed Jan. 28, 1933
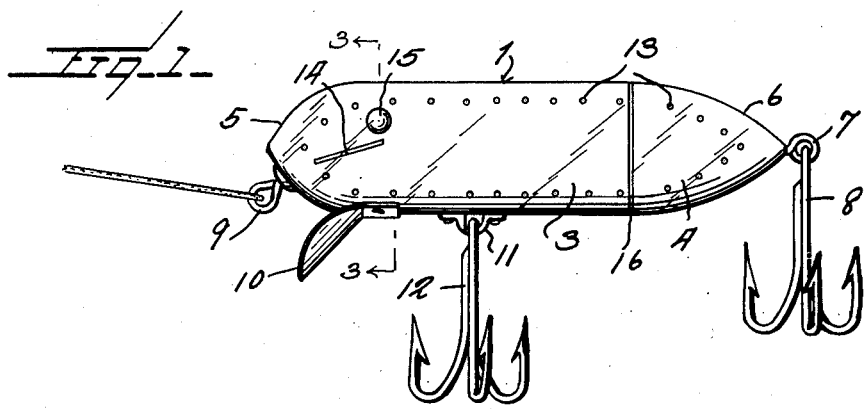
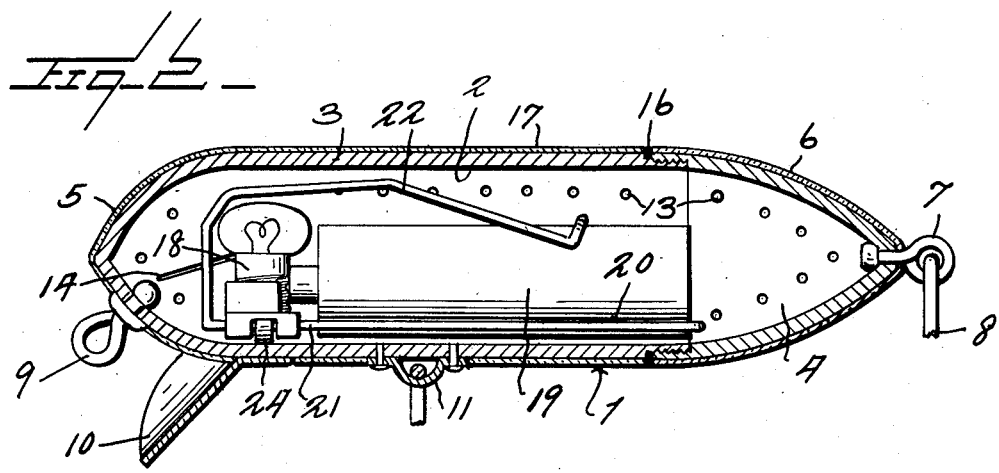
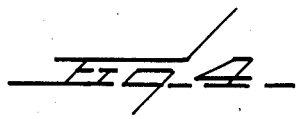
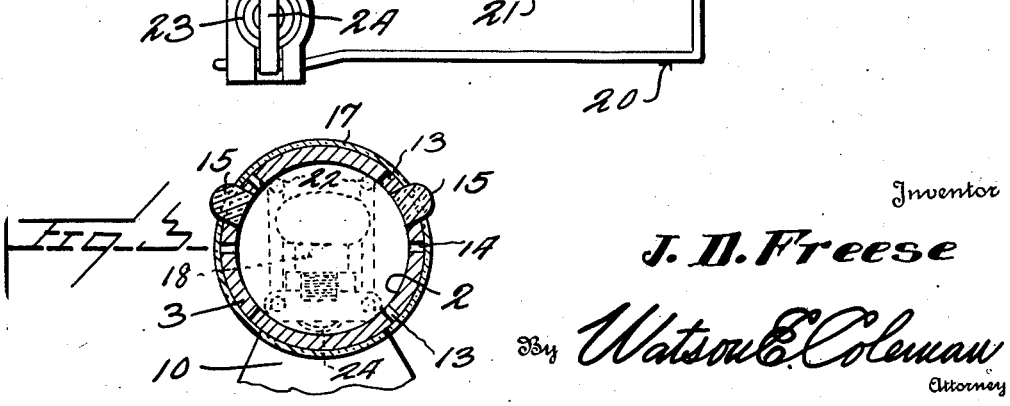
Inventor
J. D. Freese
By Watson E. Coleman
Attorney Patented Nov. 27, 1934

1,982,609

UNITED STATES PATENT OFFICE 1,982,609

FISHING LURE

James D. Freese, Pawhuska, Okla., assignor of one-half to Charles Bacon, Pawhuska, Okla.

Application January 28, 1933, Serial No. 654,031

9 Claims. (Cl. 43—44)

This invention relates to improvements in fishing lures or artificial baits and pertains particularly to an interiorly illuminated bait.

The primary object of the present invention is to provide a fishing lure or bait of hollow design and having an illuminating element therein, wherein means is provided whereby the outline of the bait will be distinctly set forth when the same is in the water where the visibility is low and the actual outline of the lure would not be seen.

Still another object of the invention is to provide an improved fishing lure of the above described character wherein a novel means is employed for mounting a lighting element therein.

Still another object of the invention is to provide a lure of novel body construction wherein the body is composed of a metallic shell having certain light transmitting openings therein and an enveloping outer shell of water-proof light transmitting material.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view in side elevation of the bait embodying the present invention;

Figure 2 is a longitudinal sectional view;

Figure 3 is a sectional view taken transversely of the bait substantially upon the line 3—3 of Figure 1;

Figure 4 is a bottom plan view of the battery and lamp holding frame.

Referring now more particularly to the drawing wherein like numerals of reference indicate corresponding parts throughout the several views, the numeral 1 indicates generally the body of the lure embodying the present invention. This body is of cylindrical design and consists of an inner metallic shell 2 which is transversely divided into the two portions 3 and 4.

This shell is preferably formed of aluminum, although any other suitable material may be employed and at its forward end it is rounded off to the relatively blunt point 5 while the rear end tapers to the relatively long point 6. The portion 4 constitutes the rear half of the shell body.

Secured in the point of the rear half of the body is an eye 7 to which is attached the hook or hooks 8. At the forward end of the lure there is secured, just below the longitudinal center, the eye 9 by which a line is attached thereto and adjacent this eye and to the rear thereof there is secured the forwardly and downwardly directed tongue or fin 10 by which a wabbling movement is imparted to the lure as it is drawn through the water. This fin or tongue is illustrative only of a means forming a part of the body whereby erratic movement may be imparted to the device when it is in use and it is to be understood that the invention is not to be limited to this particular feature as other forms of fins or wabble producing elements may be employed if desired.

Rearwardly of the fin 10 there is attached to the body the lure or hanger eye 11 in which is engaged the eye of a hook 12.

The elements 10, 11 and 12 are disposed upon the under side of the bait or lure body when the same is in use and this portion or longitudinal area on which these elements are placed will be referred to as the bottom. In each side of the shell body 2 there is outlined by a plurality of relatively small apertures, each of which is indicated by the numeral 13, an elongated ellipse which roughly follows in outline the outline of the lure body. At the forward end of the body there is cut therethrough from a point below the transverse longitudinal center and extending upwardly and rearwardly therefrom, the slot or opening 14 and above the rear end of each opening there is fitted into a suitable opening in the body of the shell the light transmitting eye 15. The slots 14 are upon both sides of the body and within the area outlined by the apertures 13 and represent the mouth portion of the lure.

As shown the two sections 3 and 4 of the metal body are threadably connected together and a gasket 16 is interposed between the opposing edges of these portions to make the same water-tight.

Each of the sections 3 and 4 of the metal body is completely covered exteriorly by an envelope 17 which is formed of a suitable transparent material which will remain unaffected by water, such, for example, as "Viscoloid" or any of the other transparent cellulose products. This substance in addition to keeping the surface of the metal body bright and untarnished also provides a transparent covering for the openings 13 and 14.

The interior of the metal shell body 2 is electrically illuminated by the incandescent light 18. This light together with the battery 19 is mounted in a frame structure which is indicated as a whole by the numeral 20 and may thus be inserted or removed as a unit. The light bulb and battery holding frame is formed of spring wire and consists of an elongated rectangular base frame 21 in which the battery 19 lies, and the integrally connected overlying frame 22.

Adjacent the point of connection between the frames 21 and 22 is mounted, upon the frame 21, the light holding socket 23 which is of insulation material and which is open upon one side so as to expose a portion of the base of the light 18 for contact by the central electrode of the battery 19. The socket 23 is open at its bottom and there extends thereacross the metal strip 24 which is connected with the frame 21 and with which the center contact of the light 18 engages so that the current will flow from the shell of the battery through the frame and the strip 24 to the center contact of the lamp and return after passing through the lamp filament, back to the center electrode of the battery by way of the lamp shell.

The battery and lamp carrying frame structure 20 is inserted into the portion 3 of the shell 2 and the free end of the top frame 22 is bent down and placed under tension as the entire frame structure is inserted, so that the unit will maintain its position.

From the foregoing it will be readily apparent that the lure herein described will be more effective in its operation than other interiorly lighted lures for the reason that its shape or form will be clearly set forth by the aperture outlined area on each side and the head will be represented by the lighted mouth slits and the lighted eyes which are of transparent material and mounted in the body or shell of the bait.

In addition to the foregoing it will be readily apparent that the insertion and removal of the lighting unit may be easily and quickly effected in view of the simple construction and the novel manner in which the parts of which it is made up are connected together and held in place in the body.

Having thus described the invention, what is claimed is:—

1. A fishing lure, comprising an elongated hollow body, hook elements carried thereby, means for illuminating the interior of the body, means whereby the outline of the body will be set forth when the body is in use which consists of an aperture outlined area upon each side of the body which is of the same contour as the body, and a light transmitting medium covering a surface of the body and said apertures and preventing the entrance of water into the body.

2. A fishing lure, comprising an elongated hollow body formed in two separable parts, hook elements carried by the body, means for illuminating the interior of the body, the said body upon each side having rows of apertures therethrough outlining an area of the same configuration as the body, the body further having upon each side and within the outlined area a light transmitting slot representing a mouth, a light transmitting eye upon each side of the body and disposed within the said outlined area, and an enveloping casing for the body consisting of a light transmitting substance, the said casing constituting a covering means for the apertures and the said mouth slots.

3. A fishing lure, comprising an elongated hollow body tapered at its ends and transversely divided to form two portions, hook elements carried by the body, and a unit removably mounted in the body and comprising a frame of resilient material retained in position within the body solely by constant frictional contact with the wall thereof, an incandescent electric light bulb and a battery, said bulb and battery being mounted upon the frame and said battery being removable therefrom independently of the bulb, the said body having light transmitting openings therein upon opposite sides thereof, the said openings upon each side outlining an area of the same general contour as the body.

4. A fishing lure comprising an elongated hollow body tapered at its ends and transversely divided to form two detachably connected sections, a hook element secured at one end of the body, a hook element secured to the body intermediate its ends, means at the other end of the body for attaching a line, means for illuminating the interior of the body comprising a removable frame structure consisting of integrally connected upper and lower frame elements, an incandescent electric light bulb socket mounted upon one of said frame elements, an incandescent light in said socket, an electric battery disposed upon the said one of said elements and electrically connected with said light, the other one of the said frame elements operating as resilient means for frictionally engaging the interior surface of the lure body when the illuminating means is inserted therein for maintaining the said means in position, the said body having at each side a plurality of apertures outlining an area of the same design as the body, the body having within each of said outlined areas and adjacent that end at which the line attaching means is carried a slot representing a mouth, and light transmitting means at each side of the body within each area and adjacent each mouth slot, representing an eye.

5. A fishing lure, comprising an elongated hollow body having tapered ends and transversely divided to form two portions, hook elements carried by the body, and a unit removably mounted in the body and comprising a frame of resilient material retained in position in the body solely by constant resilient frictional contact with the wall thereof, an incandescent light bulb and a battery, said bulb and battery being mounted upon the frame and said battery being removable therefrom independently of the bulb, the said body having light transmitting openings in the wall thereof.

6. A fishing lure, comprising a hollow body, hook elements carried by the body, means for illuminating the interior of the body, said body upon each side having rows of apertures therethrough outlining an area of the same configuration as the body, means for introducing the illuminating means into the body, and a light transmitting body covering one surface of the hollow body and covering said apertures to prevent the passage of water therethrough.

7. A fishing lure, comprising an elongated hollow body formed in two separable parts, hook elements carried by the body, means for illuminating the interior of the body, said body upon each side having rows of apertures therethrough outlining an area of the same configuration as the body, the body further having upon each side and within the outlined area a light transmitting slot representing a mouth, a light transmitting eye upon each side of the body and disposed within the outlined area, and a body formed of a light transmitting substance and covering one wall surface of the hollow body and constituting a covering means for the apertures and for the said mouth slots.

8. A fishing lure, comprising an elongated hollow body formed in two separable portions, hook elements carried by the body, said hollow body having light transmitting openings therethrough, and a lighting unit mounted within the body and comprising a base portion and a resilient upper portion overlying the base portion and connected therewith, an incandescent bulb supporting socket carried by the base portion, a bulb in said socket, and an electric battery resting upon the base portion and having electrical connection with said bulb, said overlying portion resiliently engaging the battery and holding the same in position on the base portion, and said overlying portion resiliently engaging the wall of the body to maintain the unit in position therein.

9. A fishing lure, comprising an elongated hollow body divided to form two separable portions, hook elements carried by the body, said body having light transmitting openings in the wall thereof, and an illuminating unit within the body comprising a wire frame of resilient material formed to provide a base porton, an upstanding portion, and a portion overlying the base, an incandescent bulb socket supported upon said base and having a metallic body electrically connected with the base, an incandescent bulb in said socket having one contact in engagement with said metallic body, said bulb being of the type wherein the side wall of the base forms the other contact, an electric battery having a central terminal engaging the base of said bulb and having a side wall terminal electrically connected with said first contact through said base, the said overlying portion of said base resiliently engaging and holding said battery in position and further resiliently frictionally engaging the wall of the body to retain the unit in position therein.

JAMES D. FREESE.